United States Patent
Posthuma

(10) Patent No.: US 7,058,174 B2
(45) Date of Patent: Jun. 6, 2006

(54) SYSTEM AND METHOD FOR PROVIDING LIFELINE POWER SERVICE TO DIGITAL SUBSCRIBER LINE CUSTOMERS

(75) Inventor: Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 189 days.

(21) Appl. No.: 10/848,091

(22) Filed: May 18, 2004

(65) Prior Publication Data

US 2004/0213404 A1    Oct. 28, 2004

Related U.S. Application Data

(63) Continuation of application No. 09/650,050, filed on Aug. 29, 2000, now abandoned.

(51) Int. Cl.
    *H04M 1/00*    (2006.01)
(52) U.S. Cl. .................. 379/413; 379/322; 379/323; 379/324; 379/326; 370/352; 370/356; 370/389
(58) Field of Classification Search ............. 379/322, 379/323, 324, 326, 327, 413; 370/352, 356, 370/389
    See application file for complete search history.

(56) References Cited

U.S. PATENT DOCUMENTS

| 5,943,404 A * | 8/1999 | Sansom et al. .......... 379/93.06 |
| 6,272,209 B1 * | 8/2001 | Bridger et al. ........... 379/27.01 |
| 6,400,803 B1 * | 6/2002 | Tate et al. ............... 379/27.06 |
| 6,647,117 B1 * | 11/2003 | Wallace et al. ............. 379/413 |

* cited by examiner

*Primary Examiner*—Curtis Kuntz
*Assistant Examiner*—Tuan Pham
(74) *Attorney, Agent, or Firm*—Steven R. Santema

(57) ABSTRACT

A system and method that provides lifeline service to DSL customers when a loss-of-power message is sent to the central office from an integrated access device on the customer premise. If a predetermined number of loss-of-power messages are received then power is provided to the integrated access device from the central office. To this end, a power supply at the central office provides power through an isolator circuit to a relay. The relay is connected through to the twisted pair to the integrated access device. The data connection may also be powered in this manner or, in order to save further wattage, the data connection may be disconnected for the duration of the power outage.

8 Claims, 3 Drawing Sheets

SYSTEM AND METHOD FOR PROVIDING LIFELINE POWER SERVICE TO DIGITAL SUBSCRIBER LINE CUSTOMERS

This is a continuation of application Ser. No. 09/650,050 filed on Aug. 29, 2000, now abandoned.

FIELD OF THE INVENTION

This invention relates to the field of digital subscriber lines and, more particularly, to providing power to digital subscriber line customer premise equipment in order to maintain service during times of power outages.

BACKGROUND OF THE INVENTION

Most telephone operating companies have an infrastructure of twisted-pair copper wire (also referred to as tip-ring pairs) connecting a telephone at a customer premise to a switching office. While this has been adequate for voice service for over a hundred years, modern data technologies are taxing the bandwidth limitations of twisted-pair service. Some operating companies are experimenting with fiber optic to the home, cable television (CATV) equipment, etc., in order to increase bandwidth for home and business use. These technologies are expensive to the operating companies because they require the operating company to physically rewire an entire community from each customer premise to a local switching office.

One new data service technology that takes advantage of the currently extant twisted-pair infrastructure is digital subscriber line (DSL). DSL comes in many varieties, such as asynchronous DSL (ADSL) and synchronous DSL (SDSL), each having further "flavors". The advantage of DSL is that it may be implemented over the current tip-ring pair infrastructure and, with some DSL systems, the current customer premise telephone equipment may be used. Increasingly, voice communication from a customer premise is viewed as one more payload for the DSL. Therefore, voice over DSL-(VoDSL) is proposed as a method of more fully utilizing the bandwidth of the twisted pair. An integrated access device is used on the customer premise to integrate voice service over the data service.

One issue that each DSL service provider must face is how the customer premise integrated access device is to be powered. In POTS telephony, 48 volts DC is supplied from the central office for most functions, and approximately 90 volts AC is supplied from the central office for ringing. The integrated access device must supply these voltages to all POTS telephones to which it is connected; as well as supply power to the other components (interfaces, routers, etc., as will be discussed further, below, in connection with FIG. 2). Some DSL standards specify that power is delivered from the central office in a similar manner as POTS service. However, the integrated access device requires power at all times, and requires more power than a POTS telephone. Thus, central power delivery is a very expensive proposition for the operating company. Hence, most integrated access devices are powered from the consumer power company (wherein the customer pays for the power).

One issue with VoDSL when power is provided by the power company is that, if the power goes out at the consumer premise, the customer can no longer use either the data terminal or, more importantly, the telephones. This is a problem in the art in that many regulatory agencies require emergency (911) service ("lifeline service") even during periods of power outages.

An obvious solution is to use a battery backup at the integrated access device. This solution, however, causes as many problems as it solves. In normal operation, an integrated access device does not use the batteries and the user does not know (or care) whether the batteries are fully charged or not. Only when the power goes out does the user determine whether the batteries are charged. Such a situation is not acceptable to most regulatory agencies. Battery monitoring by the operating company is generally required. However, this monitoring usually includes sending crafts people to the customer premise to replace batteries, etc. which is the most expensive method of monitoring anything.

Therefore, a problem in the art is that there is no reliable backup system or method for providing power for lifeline service to commercially powered voice over DSL customers.

SUMMARY OF THE INVENTION

This problem is solved and a technical advance is achieved in the art by a system and method that provides lifeline service to voice over DSL (VoDSL) customers on an individual, as needed basis. When an integrated access device loses power, it sends a series of predefined messages. In response, power is provided to the requesting integrated access device from the central office. To this end, a power supply at the central office provides power through an isolator circuit to a relay on the tip-ring pair. 48 to 200 volts are sent over the tip-ring pair (depending upon the application) to the integrated access device. The data connection may also be powered in this manner or, in order to save wattage, the data connection may be disconnected and only the telephones powered.

The central office power supply may be sufficient to handle simultaneous demands, or may be sized to accommodate a predefined number of integrated access devices.

BRIEF DESCRIPTION OF THE DRAWINGS

A more complete understanding of this invention may be obtained from the following description, taken in conjunction with the drawings, in which.

DETAILED DESCRIPTION

Figure 1:
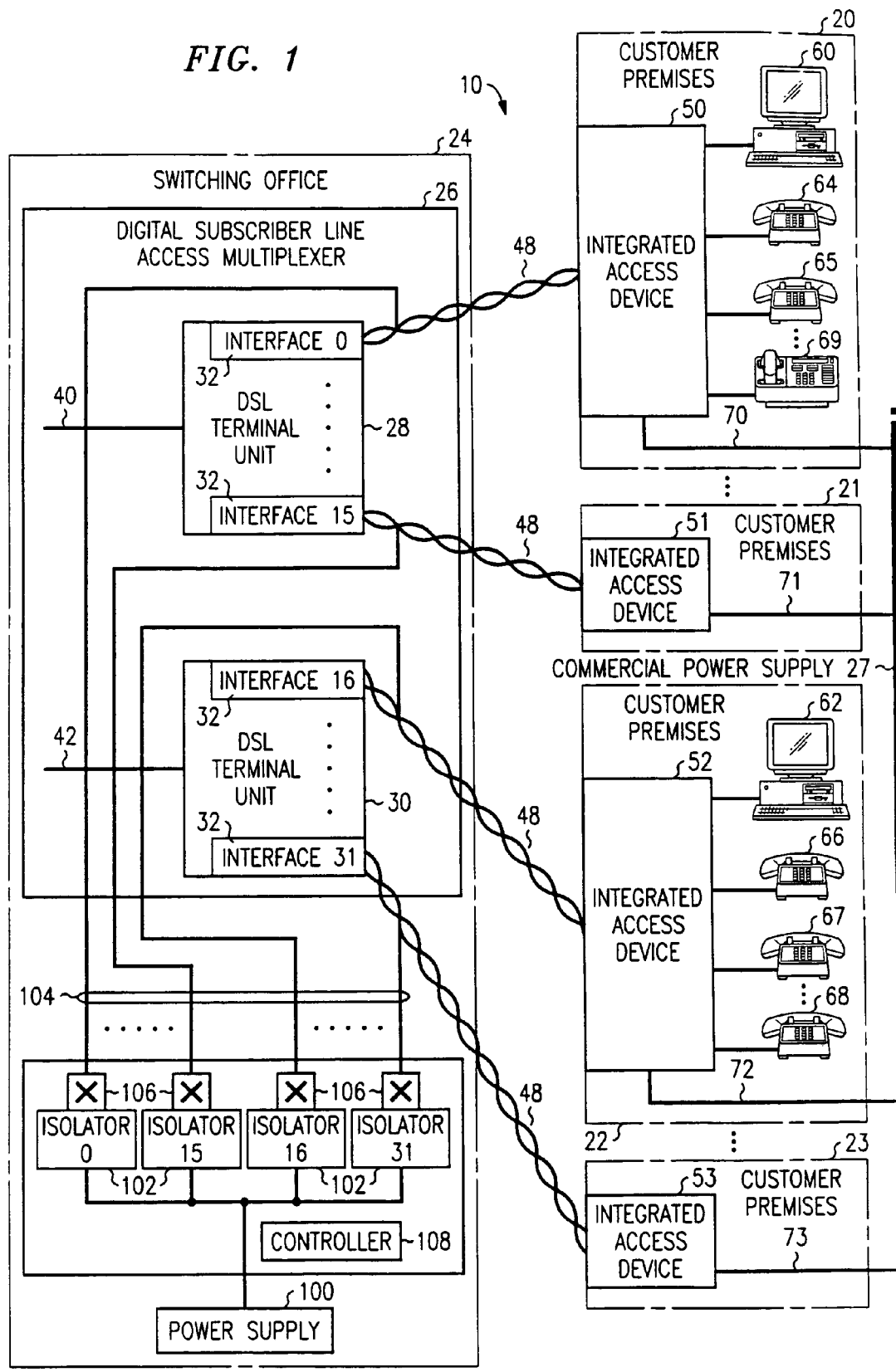
FIG. 1 is a block diagram of a voice over DSL system in which lifeline service is provided according to an exemplary embodiment of this invention.

FIG. 1 illustrates a block diagram in which a lifeline service for voice over DSL according to this invention may be implemented. FIG. 1 is a block diagram of a local service region 10 comprising a plurality of customer premises 20, 21, 22 and 23, which are served by a switching office 24. Customer premises 20–23 are also served by various portions of the commercial power grid 26.

Switching office 24 includes a digital subscriber line access multiplexer (DSLAM) 26. DSLAM 26 includes, in this exemplary embodiment, DSL terminal units 28 and 30. Each DSL terminal unit 28 and 30 supports a plurality (16 in this exemplary embodiment) of interfaces 32 for terminating twisted-wire pair from customer premise 20–23. As is known in the art, DSL terminal units 28 and 30 receive data from customer premises 20–23, multiplex the data into one stream and send it out on lines 40 and 42, respectively, for further processing. In the opposite direction, DSL terminal units 28 and 30 receive data on lines 40 and 42, demultiplex the data per destination and send it out on the appropriate interface 32. In this exemplary embodiment, only two DSL terminal units are shown, however, there are usually more in an operating switching office depending on the particular implementation.

In this exemplary embodiment, each DSL terminal unit 28 interface 32 is connected by a tip-ring pair 48 to an integrated access device 50, 51, 52 and 53 at customer premise 20–23, respectively. Integrated access devices 50–53 send and receive a digital stream over tip-ring pair 48 and distribute the signals to their intended destinations, as will be discussed further below in connection with FIG. 2. In this exemplary embodiment, tip-ring pairs 48 do not normally carry a power load. A customer premise may comprise data terminals 60 and 62, such as a personal computer, workstation or other data devices, and a plurality of POTS telephones 64, 65, 66, 67 and 68 and ISDN telephone 69. In order to provide power, integrated access device 50–52 is connected via AC cord 70, 71, 72 and 73 to portions of the commercial power grid 26.

In the prior art, when a part of the commercial power grid 26 is interrupted for any reason, i.e., cable break, electrical storm etc., one or more of integrated access devices 50–53 become inoperative. As a result, the affected data devices 60 and 62 no longer send and receive high speed data. More importantly, however, telephones 64–69 can no longer send and receive telephone calls. In the POTS prior art, the power grid and the telephone system were two totally separate entities, i.e., the central office provided power to the telephone station sets. Thus, in a blackout or other emergency, frequently telephones work when nothing else does. In a system that includes integrated access devices 50–53 or the like, which runs off of the commercial power grid 26, a further means for providing power for lifeline telephone service, i.e., 911or other emergency services, is required.

To this end, switching office 24 includes a power supply 100. Power supply 100 may be the same power supply as supplying power to the entire switching office 24 or may be, preferably, an independent, auxiliary or backup power supply. A plurality of isolators 102 are connected to power supply and to lines 104, which are connected to tip-ring pairs 48. Power supply 100 may be 40volts to 200volts. Power supply 100 does not have to be engineered to be large enough to supply full power requirements of all of the integrated access devices connected to the switching office 24, as will be discussed further, below. Thus, the operating company may realize a savings in both physical plant and cost of electricity by reasons of this invention. Isolators 102 may be transformers, op amps or similar devices.

A plurality of relays 106 are shown to connect isolators 102 to tip-ring pairs 48 under direction of a controller 108. Relays 106 are shown here as exemplary; however, they may be included within isolators 102 or may be, for example, solid state switches or op amps as is known in the art. The purpose of relays 106 is to isolate tip-ring pair 48 from power supply 100 when not in use and to provide power to integrated access devices 50–53 when power is required by any one or more of them. Isolators 102 isolate power supply 100 from data on tip-ring pairs 48 and to prevent cross talk and other "linkage" as is known in the art. A further variation may include a capacitor or other chargeable device that is charged by the power supply 100. Then the line is powered and the power supply 100 may be used to charge another device. By means of this configuration, one, two or a plurality of integrated access devices such as 50–53 may be powered when their commercial power supply 26 is unavailable. In this manner, a single interruption in the commercial power supply that affects one integrated access device such as 50 can be handled economically by the switching office providing power to just that one device. If an area-wide power outage occurs, switching office 24 may provide power to the integrated access devices in the area, either on a full power basis so that both data and telephone service may be maintained or on a limited power basis wherein only telephone service (lifeline service) is maintained. The more integrated access devices that must be powered from central switching office 24, the more likely it is that only telephones will be powered. Thus, according to this exemplary embodiment of this invention, intelligence in controller 108 provides a means for tailoring power backup to integrated access devices 50–53 so that power supply 100 may be engineered to be as inexpensive as possible given the number of integrated access devices in an area supported by the switching office 24.

Each integrated access device 50–53 informs, in this exemplary embodiment, its respective interface 32 when commercial power has been interrupted. Each integrated access device 50–53 sends three messages in succession to an interface 32 informing them of the loss of power (again, according to this exemplary embodiment). These messages are known in the art as "dying gasp," messages.

Alternatively, a keep-alive message may be used to inform DSLAM 26 via interfaces 32 when to close relays 106. For example, a keep-alive message may be sent from DSL terminal unit 28 to integrated access device 50 every X seconds, wherein DSL terminal unit 28 expects a message back from integrated access device 50 in response to its message.

Figure 2:
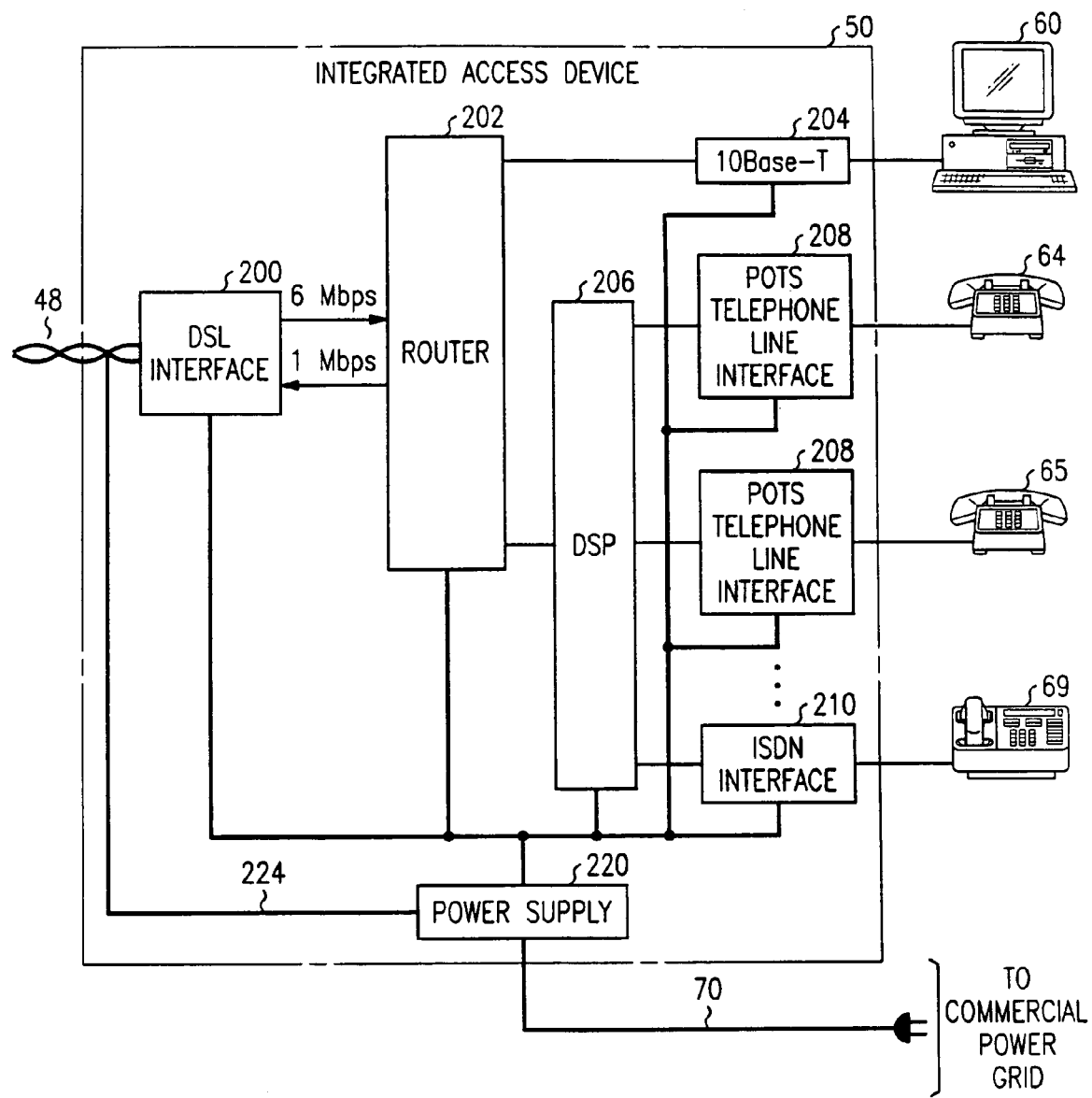
FIG. 2 is a block diagram of an integrated access device wherein lifeline service is provided according to FIG. 1.

Turning now to FIG. 2, an integrated access device 50 is shown. Integrated access device 50 is the same or similar to all the other integrated access devices 51–53. Integrated access device 50 is connected to tip-ring pair 48 via a digital subscriber line interface 200. Digital subscriber line interface 200 sends and receives signals between tip-ring pair 48 and router 202. Router 202 determines which data stream is intended for data terminal 60 and sends such data stream through, for example, an ETHERNET 10 base T interface 204 to terminal 60.

Telephone traffic is routed from router 202 to digital signal processor (DSP) 206. DSP 206 demultiplexes the signal and sends the signals to its respective POTS line interface 208 or ISDN interface 210. POTS line interface 208 provides standard BORSCHT functions as are known in the art. ISDN interface 210 provides the 2B+D channels for ISDN telephone 69.

Power is normally supplied to the components of integrated access device 50 via power supply 220. Power supply 220 normally transforms standard AC (110 volts, 60 Hz in the United States) from commercial power grid 26 (via cord 70) into DC power as required by each of the components of integrated access device 50.

According to an exemplary embodiment of this invention, when commercial power supply fails, DSL interface 200 sends messages to its respective central office interface in a DSLAM DSL terminal unit via tip-ring pair 48. Power is then supplied through tip-ring pair 48 and sent via lines 224 to power supply 220. Power supply 220 then regulates and distributes the power. In another embodiment of this invention, power supply may disconnect power to the data stream by disabling power to the 10 base T interface 204, thus conserving power from power supply 100 (FIG. 1).

Figure 3:
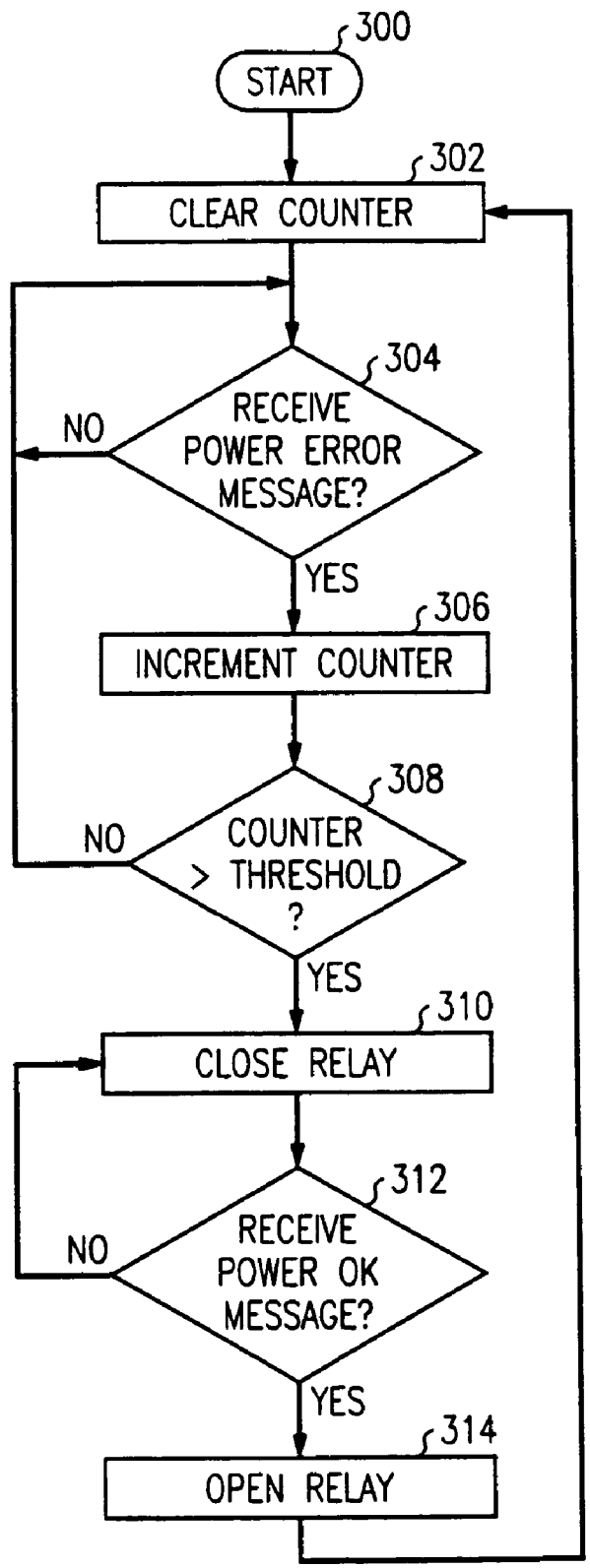
FIG. 3 is a flowchart of actions performed in order to determine when lifeline service is necessary and the steps to implement the lifeline service.

A flow chart of processing for determining whether power is necessary at the integrated access device is shown in FIG. 3. Processing starts in oval 300 and moves to box 302 where a counter is cleared. Processing moves to decision diamond 304 where a determination is made if a power error message has been received from the integrated access device. If a power error message has not been received then processing returns back to decision diamond 304.

If a power error message has been received, then processing continues to box 306 where the counter is incremented. Processing continues to decision diamond 308 where a determination is made if the counter is over a threshold. If the counter is not over a threshold, then processing proceeds back to decision diamond 304. If the counter is over a threshold, then a power error has been detected at the integrated access device. Therefore, processing proceeds to action blocks 310 where the relay that provides power is closed.

Processing continues to decision diamond 312 where a determination is made if the power error has been cleared. In other words, a power OK message has been received. If not, then processing returns to box 310 where the relay is maintained in the closed position. If the power OK message has been received, then processing continues to action blocks 314 where the relay is opened and processing loops back to action blocks 302.

Additionally, a loop could be added that a predetermined number of power OK messages must be received the relay is reopened to prevent thrashing turning the relay of opening and closing the relay.

It is to be understood that the above-described embodiment is merely an illustrative principle of the invention, and that many variations may be devised by those skilled in the art without departing from the scope of this invention. It is, therefore, intended that such variations be included within the scope of the following claims.

What is claimed is:

1. A system for providing backup power other than battery backup power for digital subscriber line service for a customer premise, said system comprising:
    a switching office having a switching office power supply and a digital subscriber line terminal unit;
    an integrated access device at the customer premise configured to route voice service to one or more telephones and data service to a data device, said integrated access device connected to said digital subscriber line terminal unit and to a commercial power grid supplying commercial power to the integrated access device, the integrated access device not relying upon battery backup power to supplement said commercial power;
    a tip-ring pair connecting the switching office to the integrated access device; and
    a controller for determining power status of the integrated access device and configured to provide power from the switching office power supply on said tip-ring pair so as to maintain said voice service and said data service at the customer premise when said commercial power at the integrated access device is determined to be off and not to provide power when said commercial power is determined to be on, the controller characterized in that
    said power supplied on said tip-ring pair from the switching office power supply is sized to accommodate said voice service and said data service at a full power level for a predetermined number of one or more integrated access devices having lost commercial power, the predetermined number being fewer than all the integrated devices supported by the switching office.

2. A system for providing backup power for digital subscriber line service in accordance with claim 1 further including means connected to said tip-ring pair between said digital subscriber line terminal unit and said integrated access unit and to said switching office power supply responsive to said controller for connecting and disconnecting said switching office power supply to said tip-ring pair.

3. A system for providing backup power for digital subscriber line service in accordance with claim 1 wherein said switching office power supply supplies between 48and 200volts to said integrated access device.

4. A system for providing backup power for digital subscriber line service in accordance with claim 3 wherein said integrated access device comprises a plurality of integrated access devices, and wherein said switching office power supply provides between 48and 200volts to each of said integrated access devices depending on the number of requests for backup power.

5. A system for providing backup power for digital subscriber line service in accordance with claim 1 further including an isolator between said switching office power supply and said tip-ring pair.

6. A switching office that provides backup power for digital subscriber line service for a customer premises supplied by commercial power, the digital subscriber line service including voice service to one or more telephones and data service to a data device at the customer premises, the digital subscriber line service not relying upon battery backup power, said switching office comprising:
    a power supply;
    a digital subscriber line terminal unit connected to an integrated access device at the customer premises by a tip-ring pair; and
    a controller to determine power status of the integrated access device configured to provide power from the power supply on said tip-ring pair so as to maintain said voice service and said data service at the customer premises when said commercial power is determined to be off and not to provide power when said commercial power is determined to be on, the controller characterized in that
    said power supplied on said tip-ring pair from the switching office power supply is sized to accommodate said voice service and said data service at a full power level for a predetermined number of one or more integrated access devices having lost commercial power, the predetermined number being fewer than all the integrated devices supported by the switching office.

7. A switching office in accordance with claim 6 further including a plurality of isolators connected between said power supply and said tip-ring pair.

8. A method for providing life line power service on digital subscriber line service for a customer premises supplied by commercial power, the digital subscriber line service not relying upon battery backup power, for use in a system comprising a switching office having a switching office power supply and a digital subscriber line terminal unit, a plurality of integrated access devices at a plurality of customer premises each configured to route voice service to one or more telephones and data service to a data device, said integrated access devices connected to said digital subscriber line terminal unit by a tip-ring pair, said method comprising the steps of:

monitoring the status of said commercial power supplied to the customer premises; and providing power from the switching office power supply on said tip-ring pair so as to maintain said voice service and said data service at a full power level for a predetermined number of the customer premises when power is determined to be off, the predetermined number being fewer than all the customer premises supported by the switching office.

\* \* \* \* \*